H. S. Fairbanks.
Drilling Pipe-Flanges.
N° 85,293.      Patented Dec. 29, 1868.
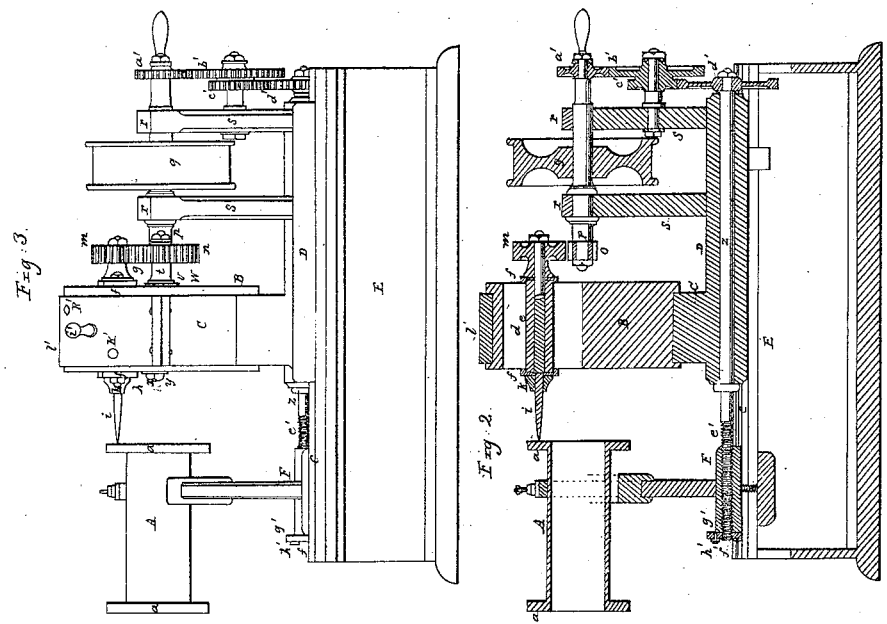
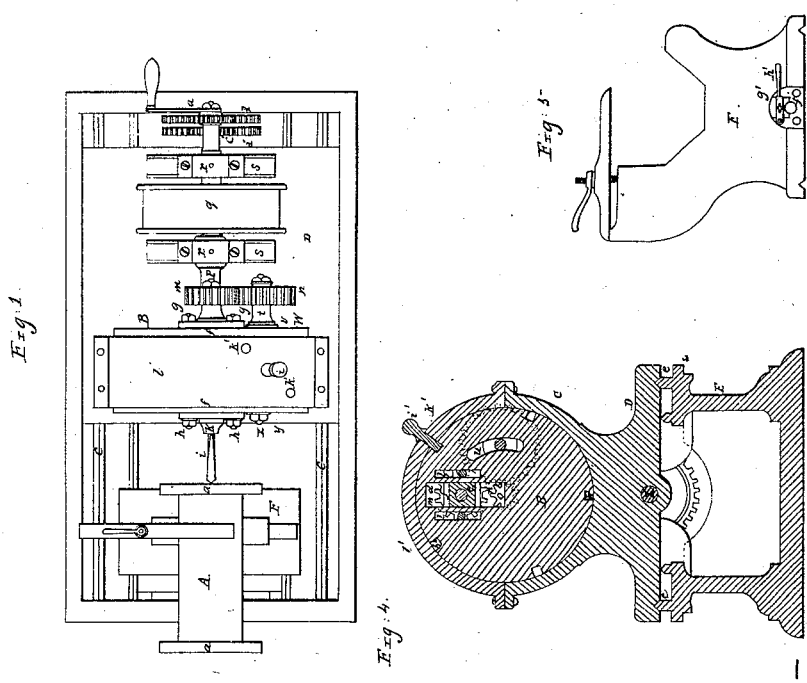
Witnesses:
S. N. Piper
J. R. Snow
Inventor:
Henry S. Fairbank
by his attorney
R. H. Eddy

HENRY S. FAIRBANKS, OF CENTRAL FALLS, RHODE ISLAND.

Letters Patent No. 85,293, dated December 29, 1868.

IMPROVED MACHINE FOR DRILLING AND BORING FLANGES OF PIPES AND CYLINDERS.

The Schedule referred to in these Letters Patent and making part of the same.

*To all persons to whom these presents may come:*

Be it known that I, HENRY S. FAIRBANKS, of Central Falls, in the county of Providence, and State of Rhode Island, have invented a new and useful or improved Machine for Boring or Drilling the Flanges of Pipes or Cyinders; and I do hereby declare the same to be fully described in the following specification, and represented in the accompanying drawings, of which—

Figure 1 denotes a top view,

Figure 2, a vertical and longitudinal section,

Figure 3, a front elevation, and

Figure 4, a transverse section of such machine.

Figure 5 is a side elevation of the pipe-supporter or poppet.

In figs. 1 and 2 a pipe, A, is represented as sustained in a proper position for having a series of holes drilled through one of its flanges, $a\ a$.

In the drawings, B exhibits what I term the "rotary head" of the machine, such head consisting of a flanged cylinder, arranged within a box or bearing, C, erected on a carriage or plate, D, such carriage being supported on parallel ways or rails, $c\ c$, of a bed-frame, E. There is within and extending through the rotary head a radial slot, $d$, within which an adjustable slide or box, $e$, is arranged. This slide or box is provided with flanges $f\ f$, and clamp-screws $g\ g$, and nuts $h\ h$, by which its distance from the axis of the rotary head may be varied and determined, so as to fix the axis of a drill, $i$, and its arbor, $k$, at a distance from the rotary head equal to the radius of the circle of a pipe-flange, through which a series of holes is to be drilled.

The drill-arbor $k$ is supported by and so as to be capable of revolving in the slide-box $e$, and for the reception of the clamp-screws of such box, the rotary head is provided with slots, $l\ l$, arranged parallel with the slot $d$.

A spur-gear, $m$, is fixed on the drill-arbor, and engages with an adjustable connection-gear, $n$, which in turn engages with a pinion, $o$, fixed on an arbor, $p$. The said arbor $p$ has its axis in the prolongation of the axis of the rotary head, and such arbor is provided with a driving-pulley, $q$, and is sustained in boxes, $r\ r$, which are upheld by two standards, $s\ s$, which are erected on the carriage or bed-plate D..

The connection-gear $n$ turns freely on an arbor, $t$, which extends through a curved slot, $u$, made through the rotary head, and concentric with its periphery.

A shoulder, $v$, of the arbor rests against a washer, $w$, placed on the arbor, and against one side of the rotary head.

The arbor extends through the head, and is formed with a screw, $x$, on which is a clamp-nut, $y$, such appliances serving to fix the arbor in the slot, in a position proper to bring the connection-gear $n$ into engagement with the pinion $o$ and the gear $m$, whatever may be the distance of the axis of the drill-arbor from the axis of the rotary head.

A feeding-screw shaft, $z$, provided with a train of operative gears, $a'\ b'\ c'\ d'$, arranged in manner as exhibited, and so as to connect such shaft with the arbor $p$, is applied to the base-plate or carriage D, as shown in fig. 2. The screw $e'$ of the said shaft extends through the base of the stationary poppet or pipe-supporter F, and also through a semi-nut carrier, $f'$, fixed to the said base. A semi-screw nut, $g'$, slides up and down in the carrier, and is provided with a hand-lever, $h'$, by which it may be moved vertically either into or out of engagement with the screw $e'$. By means of the said semi-nut, the said shaft, and its train of gears, the carriage D, with the parts supported by it, may be moved, so as to either advance or retract the drill relatively to the pipe-flange to be bored or drilled by it, the advance taking place while the drill may be in revolution.

From the above description it will be seen that the drill cannot only be made to revolve on its own axis, but, besides, may have an orbital movement imparted to it for the purpose of adjusting it in various positions in a circular path, or at equal areal distances therein.

It will also be seen that, besides such movements, the drill may be moved radially, relatively to the axis of the rotary head, or so as to be arranged at different distances from such axis, the whole being to adapt the drill to the different positions which may be required of it in or to cause it to bore through the pipe-flange a series of holes at equal distances asunder.

The rotary head is to have at its circumference one or more series of holes, leading radially therefrom, and into the head, the holes of such series being at equal distances apart therein. Those of each series, however, are to differ in number from that of either of the other series. One series of such holes is represented at $h^2\ h^2\ h^2$ in fig. 4.

A pin, $i'$, inserted in a hole, $k'$, made through the cap $l'$ of the bearing, by which the rotary head is supported, serves, with the series of holes, to fix the drill in different positions in a circular path. For each series of such holes in the rotary head there is to be a separate hole, $k'$, made through the cap.

With the machine above explained, the flange of a pipe or cylinder may be bored or drilled with great facility and accuracy, and without the necessity of revolving the said pipe or cylinder, after having been once adjusted, with its axis, in the prolongation of that of the rotary head.

I make no claim to the application, to a drill-arbor, of means of imparting to it a revolution on its own axis, and an orbital revolution besides, in order to adjust it in different positions in the circumference of a circle.

I claim, in combination with the rotary head B, the drill-arbor $k$, the driving-shaft $p$, and the gears $m\ o$, arranged as set forth, the connection-gear $n$, the movable box $e$, and their adjusting-devices, substantially as described, applied to them, and the head B, whereby the box $e$ may be adjusted, and fixed at different radial distances relatively to the axis of the head B, and the gear $n$ may be adjusted and fixed so as to engage with the gears $m\ o$, after any such adjustment of the said arbor, the whole being for the purpose and to operate as explained.

HENRY S. FAIRBANKS.

Witnesses:
R. H. EDDY,
SAMUEL N. PIPER.